G. KRUM.
CAR COUPLING.
APPLICATION FILED JULY 8, 1920.
1,426,652.
Patented Aug. 22, 1922.
3 SHEETS—SHEET 3.
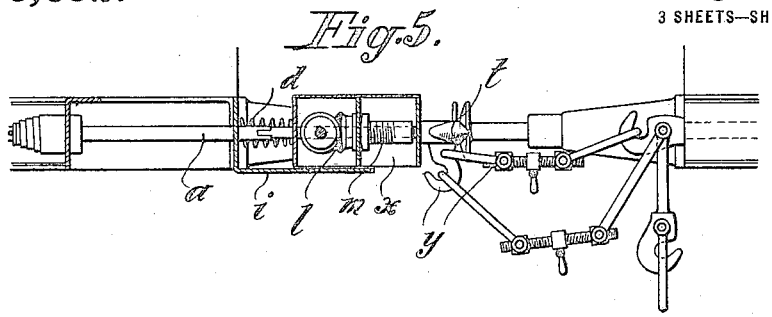
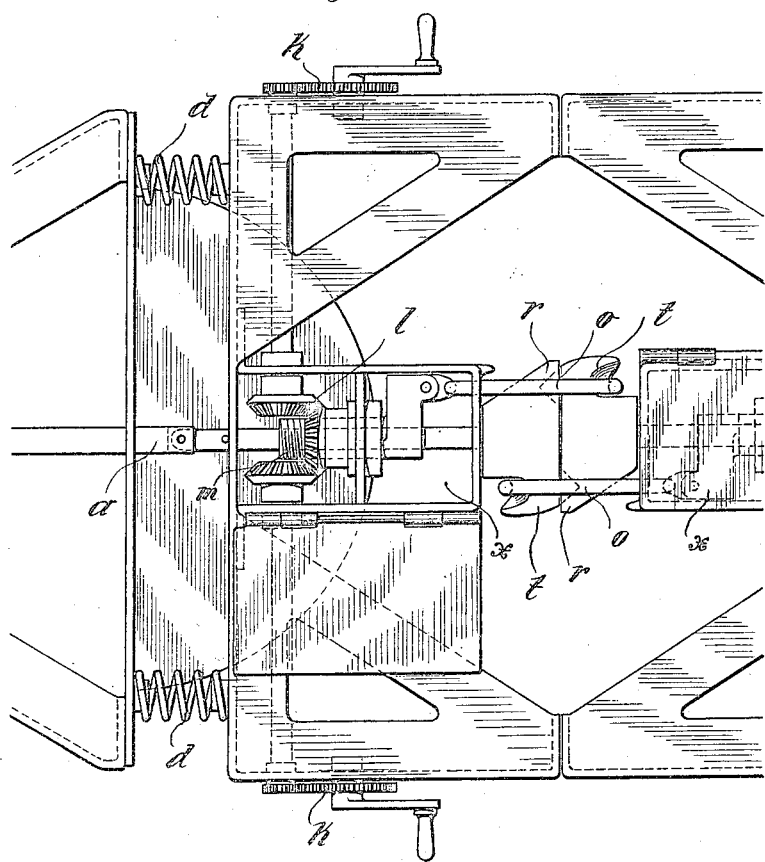

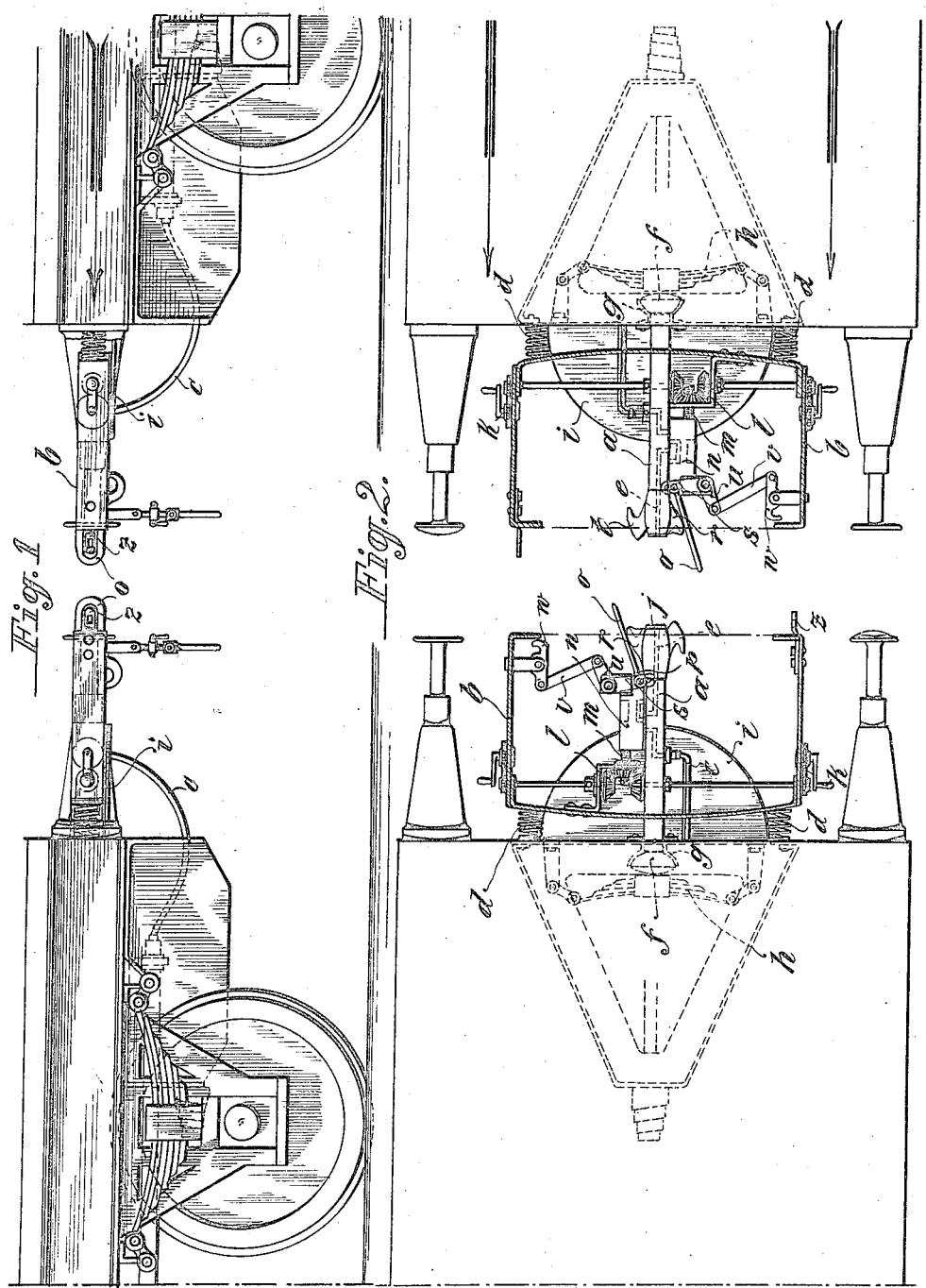

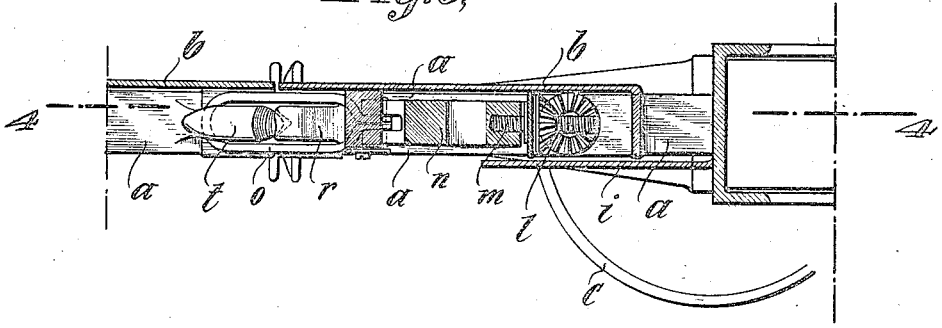
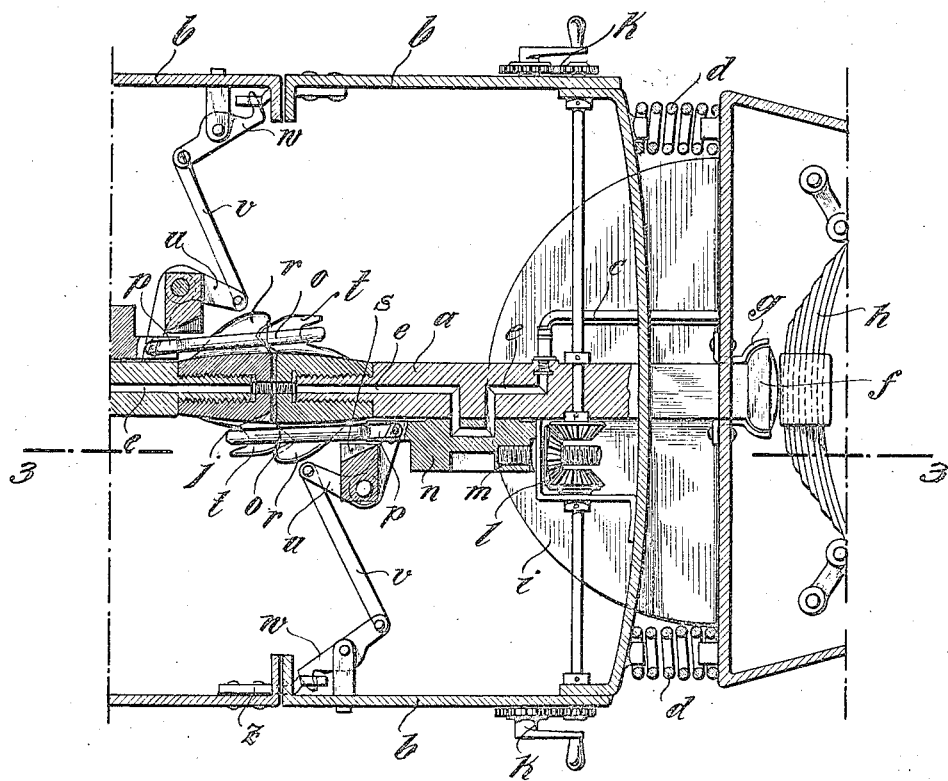

UNITED STATES PATENT OFFICE.

GUSTAV KRUM, OF DUISBURG-BEECK, GERMANY.

CAR COUPLING.

1,426,652.

Specification of Letters Patent.    Patented Aug. 22, 1922.

Application filed July 8, 1920. Serial No. 394,846.

(GRANTED UNDER THE PROVISIONS OF THE ACT OF MARCH 3, 1921, 41 STAT. L., 1313.)

*To all whom it may concern:*

Be it known that I, GUSTAV KRUM, a citizen of the German Republic, residing at Duisburg-Beeck, Germany, have invented certain new and useful Improvements in Car Couplings, of which the following is a specification.

The present invention has reference to improvements in car couplings and relates more specifically to a safety coupling operable from either side of the car without danger to the shunter, and it substantially comprises identical complemental couplings respectively mounted on the front and rear car platforms for co-operation, steam and air pressure conduits being provided for allowing the pressure media to pass therethrough from one car to the other only in coupled position of the parts, the pressure passages being automatically occluded on the cars being uncoupled.

My invention will best be understood when described in connection with the accompanying drawings, in which Fig. 1 is a side elevation of two car ends with the new couplings in uncoupled position; Fig. 2 is a top view thereof, partly in section; Fig. 3 is a horizontal section on line 3—3 of Fig. 4, which latter is a section, partly in plan, on line 4—4 of Fig. 3; Fig. 5 is a side view, partly in section of a modification, and Fig. 6 is a top view, on a somewhat enlarged scale, of a simplified form of construction applied to freight cars.

The draw bar $a$, which is suitably guided in the car end frame, supports the housing $b$, in the form of a flat box, which is preferably provided with a bottom and a lid but is open in front, buffer springs $d$ being interposed between its rear wall and the car wall. The draw bar is provided with a globular interior base $f$ which is held seated in the rigid cup member $g$ by a strong spring $h$, so that the draw bar and with it the housing $b$ can horizontally oscillate to the required extent on the carrier arc $i$. On opposite sides of the housing, near the car buffers, so as to be readily accessible from the side of the car, there are provided manually operable sets of gears $k$ operating a common bevel wheel $l$, which latter is journaled in a fixed car part and threads on a screw bolt $m$ which, obviously, on rotation of the bevel gear $l$ in the one or the other direction is respectively displaced toward or away from the car end. To the front end of this screw bolt is rigidly secured in close contact with the drawbar a slide block $n$, to which is pivotally secured the coupling link $o$ whose contracted inner end $p$ is designed to co-operate with a cam portion $r$ of the draw bar head in such manner that when the block $n$ is shifted forwardly, away from the sill, the link $o$ will ride up on the incline $r$ and assume the outfolded position shown in Fig. 2.

To the slide block $n$ is further pivoted a bell crank $u$ which by means of the interposed link $v$ operates the double-arm hook lever $w$ fulcrumed on the housing $b$. An eye member $z$ extends from the other end of the housing, and these hook levers $w$ and eyes $z$ of two facing couplings hookingly engage upon the slide blocks $n$ being operated for intercoupling the respective coupling sets, as shown in Fig. 4.

Normally, that is, in uncoupled position, the parts assume the position shown in Fig. 2. The two cars are now pushed together and the shunter operates the hand crank of the one coupling in the direction which will advance the block toward the other coupling, which causes the link $o$ to extend a little beyond the inner point of the coupling hook $t$ of the draw bar of the other coupling. He then quickly reverses the rotation of the bevel gear $l$ and retracts thereby the block $n$, with the result that the coupling link $o$ rides down the incline $r$ and firmly engages behind the hook $t$; simultaneously the hook lever $w$ engages in the eye $z$ of the facing coupling. The same operations are then carried out in the case of the other coupling, after which the two cars are intercoupled at four different points, as it were. For uncoupling the cars, the described manipulations are reversed.

The conduits $c$ for the compressed air and steam preferably extend through the draw bars and the slide blocks $n$, as shown in Fig. 4, the passages $e$ opening through a suitable packing $j$ in the front face of the draw bars, so that a continuous communication is obtained through the coupled cars for the pressure media. For automatically interrupting this communication on uncoupling, the passages *e* are branched off through the slide block, whereby on forward displacement of the latter for uncoupling purposes the continuity of the conduits is interrupted, sheered off so to say, as shown in Fig. 2 in dashed lines. On retracting the block *n* for coupling purposes the communication through the conduits is again established as soon as the draw head faces are held pressed together.

The improved couplings can readily be applied to old type cars provided with the well known turn-buckle tightening devices *y* (Fig. 5), the air and the steam hose lines *c* being connected to the draw bar passages *e* in suitable manner (Fig. 4).

In Fig. 6 is shown a simplified construction of the coupling intended primarily for freight cars, where air and steam conduits are not required. The screw bolt *m*, shifted by the bevel gear *l* as above described, in this instance is tubular and loosely surrounds the articulated draw bar *a* within a lidded casing *x*. The side coupling members *w* and *z* are dispensed with, otherwise the operation of the slide block with its coupling link and hook is substantially that described above.

What I claim is:—

1. In a car coupling of the character set forth, in combination with the end of a car, a draw bar articulated to the car end, a slide member adapted for longitudinal displacement on said draw bar, means manually operable from the sides of the car for displacing said slide member relative to said draw bar, a coupling link pivoted to said slide member, means for causing lateral turning-out of said link about its pivot on relative forward displacement of said slide block, and a hook member at the outer extremity of said draw bar.

2. In a car coupling of the character set forth, in combination with the end of a car, a draw bar resiliently articulated to the car end, a slide member adapted to be longitudinally displaced relative to said draw bar, means operable from both car sides for relatively displacing said slide member, a coupling link pivoted near the outer extremity of said draw bar and a hook member at the end of said draw bar, and means for causing said coupling link to swing about its pivot on relative displacement of said slide member, comprising a cam surface on said draw bar and a contraction in said coupling link adapted to cooperate with said cam surface.

3. In a car coupling of the character set forth, in combination with the end of a car, a draw bar resiliently articulated to the car end, a housing supported by said draw bar, a coupling eye extending forward from one of the side walls of said housing, a cam surface and a hook member at the outer extremity of said draw bar, a slide member and means for relatively displacing said slide member along said draw bar in parallelism and in close contact therewith, a coupling link pivoted to said slide member and adapted for cooperation with said cam surface thereof, a link and lever mechanism with a hook at its free terminal end and operable by the relative displacement of said slide member, and said draw bar and said slide member having steam and air passages extending part way therethrough and adapted to be placed into and out of communication with one another by the relative displacement of said slide member.

In testimony whereof I affix my signature.

GUSTAV KRUM.